(No Model.)
J. T. DAVIS & I. STEAD.
AMALGAMATOR.
No. 281,982. Patented July 24, 1883.
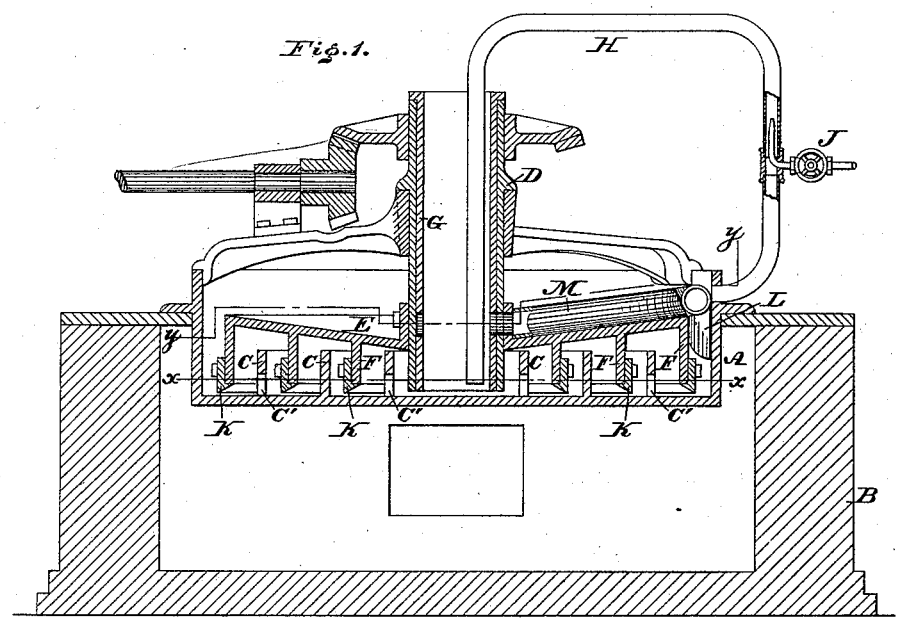
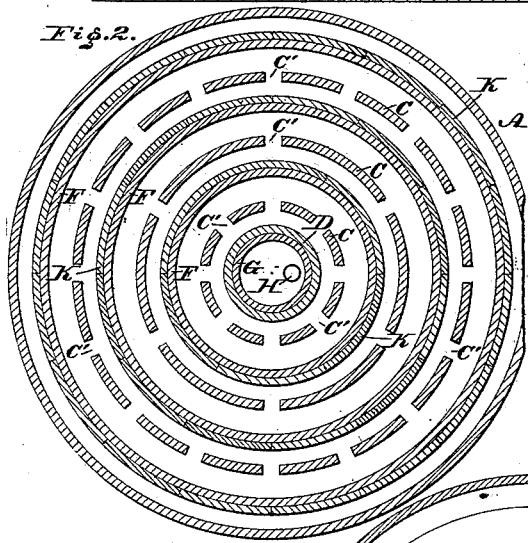
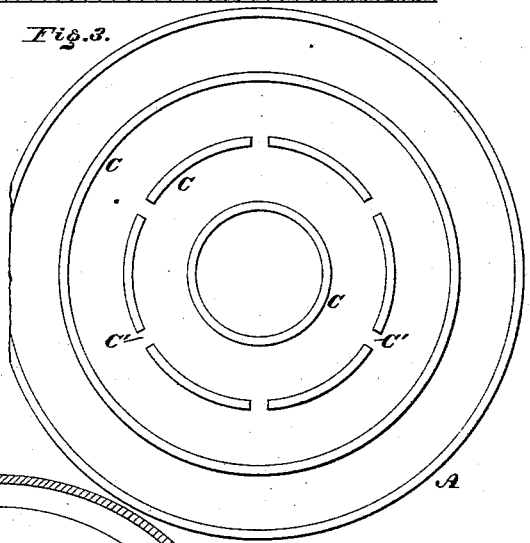
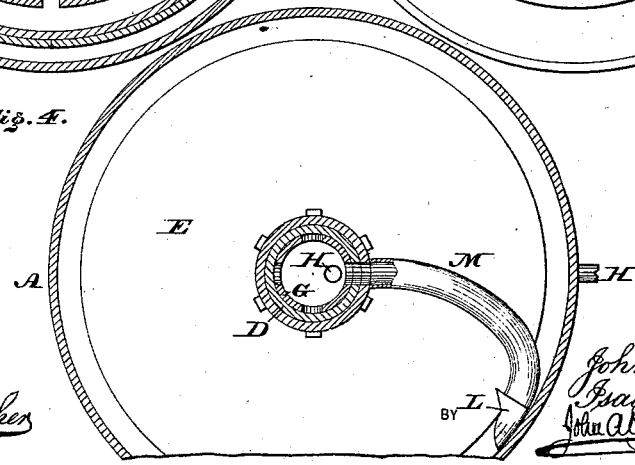
WITNESSES:
A. P. Grant,
W. F. Kircher
INVENTORS:
John T. Davis,
Isaac Stead,
BY John A. Wiedersheim
ATTORNEY.
N. PETERS. Photo-Lithographer, Washington, D. C.

UNITED STATES PATENT OFFICE.

JOHN T. DAVIS, OF RAHWAY, NEW JERSEY, AND ISAAC STEAD, OF PHILADELPHIA, PENNSYLVANIA; SAID DAVIS ASSIGNOR TO SAID STEAD.

AMALGAMATOR.

SPECIFICATION forming part of Letters Patent No. 281,982, dated July 24, 1883.

Application filed October 21, 1882. (No model.)

*To all whom it may concern:*

Be it known that we, JOHN T. DAVIS, of Rahway, in the county of Union, State of New Jersey, and ISAAC STEAD, of the city and county of Philadelphia, State of Pennsylvania, both citizens of the United States, have invented a new and useful Improvement in Amalgamators, which improvement is fully set forth in the following specification and accompanying drawings, in which—

Figure 1 is a central vertical section of the amalgamator embodying our invention. Fig. 2 is a horizontal section thereof in line $x\ x$, Fig. 1. Fig. 3 is a top or plan view of the pan. Fig. 4 is a horizontal section in line $y\ y$, Fig. 1.

Similar letters of reference indicate corresponding parts in the several figures.

Our invention consists of certain improvements in amalgamators, whereby the work is more thoroughly and effectively accomplished, as will be hereinafter fully set forth.

Referring to the drawings, A represents the amalgamating-pan, which is suitably mounted, it being shown in connection with a furnace, B, so that it may be used as a lead-bath when so desired.

From the bottom of the pan A rise a series of concentric curvilinear flanges, C, the openings C' in the flanges constituting ports for the passage of the material in the pan.

D represents an upright tubular shaft, which is properly mounted, and has connected gearing whereby it may be rotated.

To the lower end of the shaft D is secured a cover, E, to whose under side is attached a series of concentric flanges, F, which are fitted alternately within the flanges C of the pan A.

G represents a hollow chute or feed-shaft, which is inclosed by the hollow shaft D, and leads to the bottom of the pan A, where it discharges the material thereon. A pipe, H, leads from the pan A at a point above cover E, and is bent above said shaft G and extended down through said shaft, discharging at the bottom thereof. A steam-injecting pipe, J, discharges into said pipe H.

To the flanges F of the cover E are secured at intervals shoes K, which are beveled on their under sides, and to the periphery of said cover E is secured a scoop, L, which is located within the pan A, and communicates with a chute, M, which is supported on the cover E, and has its inner end in communication with the feed-pipe or shaft G, by means of openings in the shaft D and said shaft G.

It will be seen that when the shaft D is rotated the cover E and attached flanges F are also rotated. The ore is admitted through the chute G, and reaching the pan A is agitated and passed through the ports C' to the periphery of the pan. This passage of the ore to the periphery is caused to be rapidly accomplished by the shoes K, which also serve to force the ore on the mercury in the pan. The scoop L raises the material and mercury, which may be forced to the top of the cover E, and directs the mercury to the chute M, consequently to the pipe or feed-shaft G, whereby said mercury may be reconveyed to the pan. The pipe H, under action of the steam-injecting pipe J, causes a rapid admixture of the pulped material, said material as it rises in the pan being drawn to the pipe H, and reconveyed by the latter to the center of the pan and impacted on the mercury on the bottom thereof. After the action of the mercury is complete the material is removed from the pan and a fresh charge substituted.

Having thus described our invention, what we claim as new, and desire to secure by Letters Patent, is—

1. The pan provided with the annular flanges C, having ports C', in combination with the rotary cover having annular flanges F, which are provided with shoes K, substantially as set forth.

2. The pan, cover, and feed-shaft, in combination with the scoop L and returning-chute M, substantially as and for the purpose set forth.

3. The pan, rotary cover, and feed-shaft, in combination with a pipe, H, connected at one end with the pan above the cover, the other end of said pipe extending down within said pan to near the bottom thereof, and the steam-injector pipe J, operating substantially as set forth.

4. The pan and rotating cover E, provided, respectively, with flanges C and F, in combination with the shaft D to which said cover is attached, the tubular feed-shaft G, extending down through shaft D, the pipe H, extending from the upper part of the pan over said feed-shaft and down through the same to the bottom thereof, the injector J, discharging into said pipe, the scoop L, chute M, and the shoes K, all substantially as set forth.

JNO. T. DAVIS.
ISAAC STEAD.

Witnesses:
W. S. BOGERT,
JOHN A. WIEDERSHEIM.